United States Patent [19]

Rom et al.

[11] Patent Number: 5,046,150
[45] Date of Patent: Sep. 3, 1991

[54] ALTERNATORS

[75] Inventors: Terence Rom; Barrie C. Skinner, both of London, England

[73] Assignee: Lucas Industries public limited company, Birmingham, England

[21] Appl. No.: 559,323

[22] Filed: Jul. 30, 1990

[30] Foreign Application Priority Data

Aug. 14, 1989 [GB] United Kingdom ................. 8918430

[51] Int. Cl.⁵ ............................................ H02K 23/50
[52] U.S. Cl. .................. 310/68 D; 310/261; 310/254
[58] Field of Search ............ 310/68 D, 261, 262, 310/263, 254, 258, 179, 152, 66, 67 R, 112, 114; 318/140, 141; 290/46

[56] References Cited

U.S. PATENT DOCUMENTS

| 3,467,844 | 9/1969 | Bird | 310/168 |
| 4,052,631 | 10/1977 | Kuter | 310/68 D |
| 4,424,464 | 1/1984 | Ikegami | 310/68 D |
| 4,438,359 | 3/1984 | Royer | 310/68 D |
| 4,724,346 | 2/1988 | Klein et al. | 310/68 D |

FOREIGN PATENT DOCUMENTS

| 56-112866 | 5/1981 | Japan | 310/68 D |
| 2093640 | 9/1982 | United Kingdom | 310/68 D |

OTHER PUBLICATIONS

Swiss Technical Journal, (B 3 w) W. DeCock Buning, Loctite Europa N.V., 52, avenue des Arts, Brussel 4, Belgium.

Primary Examiner—Steven L. Stephan
Assistant Examiner—Matthew Nguyen
Attorney, Agent, or Firm—Nixon & Vanderhye

[57] ABSTRACT

An alternator for mounting on an internal combustion engine has a pair of stator assemblies mounted in end to end relationship with a shaft running through the assemblies. The shaft carries a pair of rotor assemblies and the energizing windings for the rotor assemblies are mounted on bridging members which extend from the adjacent end portions of the casing of the alternator.

6 Claims, 1 Drawing Sheet

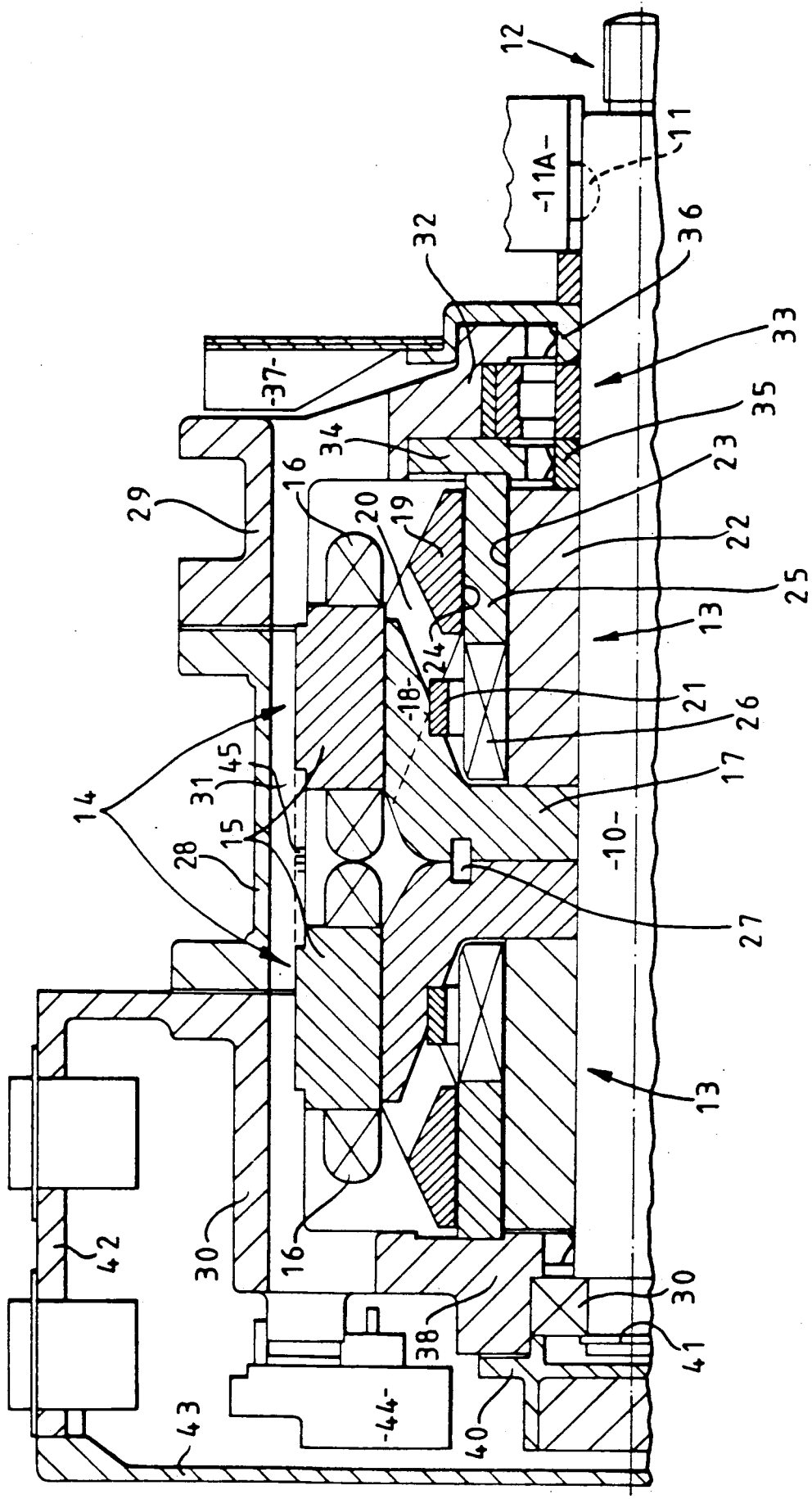

ALTERNATORS

BACKGROUND OF THE INVENTION

1. Field of the Invention

This invention relates to an alternator for mounting on an internal combustion engine and of the kind comprising a pair of stator assemblies mounted in end to end relationship each stator assembly carrying an output winding, a rotary shaft extending through the stator assemblies, one end of said shaft being adapted to be driven by the associated engine and a pair of rotors mounted on the shaft for producing in the stator assemblies respectively a rotating magnetic field.

2. Discussion of Prior Art

Such an alternator is known in which the shaft carries a pair of field windings which are associated with the rotors respectively and the windings are connected together and electric current is supplied to the windings by way of a pair of slip rings located at the end of the shaft remote from said one end. The provision of the slip rings means that the shaft must be of extended length and the brush gear associated with the slip rings occupies space in the surrounding casing of the alternator leaving less space for the usual rectifier assemblies and the voltage regulators. In addition, the brushes wear in the use of the alternator, this wear being accelerated if precautions are not taken, by dirt in the cooling air which passes through the alternator. Moreover, the sparking which takes place constitutes a source of electro-magnetic radiation.

SUMMARY OF THE INVENTION

The object of the present invention is to provide an alternator of the kind specified in a simple and convenient form.

According to the invention in an alternator of the kind specified each rotor comprises a first rotor part having axially directed pole teeth formed integrally with a base portion which is located about the shaft, a second rotor part also having axially directed pole teeth which are alternately arranged with the pole teeth of the first rotor part, the axially directed pole teeth of the second rotor part being formed integrally with an annular member, means securing the two rotor parts together, an annular yoke member mounted about the shaft and being secured at one end to said base portion, said yoke member and said annular member defining cylindrical spaced surfaces, a bridging member of annular form located with clearance between said cylindrical surfaces and an annular field winding carried by said bridging member, said rotors being mounted on said shaft so that said base portions are in back to back relationship, said bridging members and the associated field windings being mounted on respective end portions of the causing of the alternator.

BRIEF DESCRIPTION OF THE DRAWING

An example of an alternator in accordance with the drawing will now be described with reference to the accompanying drawing which shows a sectional side elevation of one half of the alternator.

DETAILED DISCUSSION OF PREFERRED EMBODIMENTS

Referring to the drawing there is provided a shaft 10 which at one end is provided with a key way 11 and a threaded portion 12. In use, the shaft carries a grooved pulley 11A which is retained by means of a retaining nut engaged with the threaded portion of the shaft.

Mounted on the shaft 10 are a pair of rotors 13 which are of identical construction as will be explained and associated with the rotors are a pair of stator assemblies 14 respectively. Each stator assembly comprises an annular internally slotted stator 15 in the slots of which are wound windings 16 in the usual manner to provide a three-phase output.

Each rotor comprises a first rotor part which includes a base portion 17 from the periphery of which extend a plurality of integral pole teeth 18 and a second rotor part which includes an annular member 19 from which extend in the opposite direction, a plurality of integral pole teeth 20. The teeth 18 and 20 are alternately arranged. The two parts are formed from magnetisable material and are secured together by an annular band 21 formed from non-magnetic material and to which the teeth are pinned or otherwise secured. Each rotor also includes a hollow cylindrical yoke member 22 also formed from magnetisable material which is mounted about the shaft 10 and which is in engagement with the respective base portion 17. The yoke member 22 and the annular member 19 define cylindrical surfaces 23, 24 which are presented to each other but which are spaced by an air gap which is occupied by an annular bridging member 25 which is secured to a casing part of the alternator The bridging member 25 is formed from magnetisable material and its inner and outer cylindrical surfaces form running clearances with the cylindrical surfaces 23, 24. The bridging member supports an annular winding 26 which extends with clearance about the yoke member. The winding is carried upon a support age secured to the end of the bridging member and the connections to the winding extend through openings formed in the bridging member In use, when the winding is energised from a unidirectional supply the pole pieces 18 and 20 assume opposite magnetic polarity, the magnetic flux passing across the aforementioned working clearances. As the rotor rotates a rotating magnetic field is produced which causes a voltage to be induced in the stator winding.

As will be seen the rotors are mounted on the shaft in back to back relationship with the base portions 17 of the first rotor parts in engagement with each other. A special assembly method is employed as follows. The yoke member 22 of the right hand rotor is first secured on the shaft 10 by a heat shrinking technique and the associated base portion 17 is then secured to it by means of axially disposed screws not shown. It is of course to be understood that the member 19 together with the teeth 20 are already secured to the first rotor part. The base portion 17 of the left hand rotor with the associated member 19 secured to it is then secured by screws to the associated yoke member 22 and the two components are slid onto the shaft and secured thereon by adhesive. In order to secure the correct angular relationship between the rotors a dowel or dowels 27 may be provided which extend between the base portions 17 of the rotors. Other methods of locating the rotors may be employed.

The alternator includes a casing which is formed in three parts, the central part 28 having flanges at its opposite ends whereby it can be secured to the outer casing parts 29, 30. The internal surface of the central part 28 is stepped to provide axial location for the stator assemblies 14 and it is also provided with a plurality of axially extending grooves which define ventilation slots 31 the slots extending into the outer casing parts. The outer casing part 29 which surrounds part of the right hand rotor is provided with a boss 32 in which is machined a recess for the outer member of a roller bearing 33. The outer member of the roller bearing is retained within the recess by a clamp plate 34 which is secured to the boss 32 by screws. Prior to securing the clamp plate to the boss, the bridging member 25 of the right hand rotor is secured to the clamp plate by screws and location of the bridging member relative to the clamp plate is provided by a step which is machined on the side surface of the clamp plate. The electrical connections to the winding are led through the bridging member as previously described and through the clamp plate and are taken to the left hand end of the alternator through one of the aforesaid ventilation slots.

The inner member of the bearing 33 is a push fit on the shaft and an annular spacer 35 is interposed between the inner member of the bearing and the yoke member 22. The outer surface of the spacer 35 forms a rubbing surface for an oil seal which is carried by the clamp plate and a further oil seal is positioned on the other side of the bearing and is carried on the boss 32. The seal engages with the surface of a sleeve 36 mounted about the shaft and having one end engaging the inner member of the bearing 33. The sleeve 36 carries a plurality of fan blades 37 which induce a flow of air through the alternator. The pulley 11A is shown spaced from the sleeve 36 by a further sleeve however, it can engage the sleeve and when the nut is tightened the inner member of the bearing 33 will be firmly located on the shaft. The fan blades and the sleeve 36 can be formed as a steel pressing.

The other outer casing part 30 also defines a boss 38 to which is secured by screws, the bridging member 25 of the left hand rotor. The boss is machined to accommodate the outer member of a ball thrust bearing 39 and the outer member of the thrust bearing is retained in position by an end cap 40 which can be secured to the boss 38. The inner member of the thrust bearing locates about the shaft against a shoulder thereon and a circlip 41 can be located in a groove in the shaft to secure the shaft against axial movement relative to the bearing. The casing part 30 is extended outwardly to define a housing wall 42 the open end of which is closed by means of an apertured cover 43. The housing can accommodate rectifier assemblies generally indicated at 44, whereby the alternating current output from the windings 16 can be rectified. Moreover the housing can also accommodate a regulator for controlling the current flow in the windings 26. When the shaft is rotating the fan 37 draws air through the apertures in the cover 43 to cool the rectifier assemblies and the regulators before entering the casing to cool the various windings therein.

The output windings 16 may be connected together to a single rectifier unit or to individual rectifier units. In the former case the windings 26 may be connected in series and controlled by a single regulator. In the latter case the current flowing in the windings 26 can be controlled by separate regulators and also with this method of connection the output voltages can be different and/or utilized to supply different circuits at the same voltage. As an example, one stator and rotor together with the associated rectifier may be arranged to provide a direct current output voltage of 12 volts and the other an output voltage of 24 volts. It is also possible to arrange that the two sets of windings have different operating characteristics. For example, one winding can be arranged to provide a higher output at a low shaft speed than the other winding but a lower output at a high shaft speed than the other winding. In the example the pole teeth 18 of the two rotors are in angular alignment This has been found to allow for the maximum air flow through the slots 31. However, if with the windings and rectifier units connected to provide a single output and if the pole teeth 18 of the two rotors are displaced by half the pitch of the teeth, the ripple frequency will be increased and the amplitude of the ripple reduced. This can be an advantage if it is necessary to smooth the output voltage. The flow of air through the slots 31 is however impaired.

As an alternative to the circlip 41 the shaft 10 may be provided with a screw thread to receive a nut, which through a washer can act to retain the inner member of the bearing 39 against the shoulder on the shaft.

Furthermore, the outer member of the bearing 33 can be retained in the recess in the boss 32 by means of adhesive. In this case the role of the plate 34 is to support the bridging member 25 only.

In the example the central part 28 of the casing and the outer parts 29, 30 provide for axial location of the stators 15. Moreover, each stator iu spigoted in the central part and the respective outer part. In an alternative arrangement not shown, the stators 15 are mounted in the outer parts 29, 30 respectively as described but the central part provides no axial or radial location. In this case the stators are located against the shoulders in the outer parts 29, 30 by means of an annular spring washer which is located between the stators 15. Moreover, an annular clearance is defined between the central part 28 of the casing and the stators. In order to provide positive location of the outer casing parts 29, 30 relative to the central part 28, the presented surface of the parts are provided with complementary steps.

I claim:

1. An alternator for mounting on an internal combustion engine comprising:
   a pair of stator assemblies mounted in end to end relationship, each stator assembly carrying an output winding,
   a rotary shaft extending through the stator assemblies and
   a pair of rotors mounted on the shaft for producing in the stator assemblies rotating magnetic fields, respectively,
   one end of said shaft being adapted to be driven by said engine, each rotor comprises:
   a first rotor part having axially directed pole teeth formed integrally with a base portion located about the shaft,
   a second rotor part having axially directed pole teeth which are alternately arranged with the first rotor part pole teeth, the second rotor part pole teeth being formed integrally with an annular member,
   a non-magnetic means for securing said first and second rotor parts together,
   an annular yoke member mounted about the shaft and being secured at one end to said base portion, said yoke member and said annular member defining spaced cylindrical surfaces,
   an annular bridging member located with clearance between said cylindrical surfaces and an annular field winding carried by said bridging member, said rotors being mounted on said shaft so that the base portions are in back to back relationship, said bridging members and the associated field windings being mounted on respective end portions of the casing of the alternator wherein one of said yoke members is secured to the shaft and the respective base portion is secured to the yoke member, the other of said yoke members and respective base portions are secured together and said other yoke member and respective base portion is secured to the shaft by means of adhesive, the two rotors being located relative to each other by a dowel.

2. An alternator according to claim 1 wherein said casing is formed in three parts the outer parts supporting the bearings for the shaft and providing radial and axial location for the stator assemblies, the centre part of the casing acting to space the outer parts of the casing.

3. An alternator according to claim 2 wherein said centre part of the casing provides axial and radial location of the stator assemblies.

4. An alternator according to claim 2 further including a spring washer acting intermediate the stator assemblies.

5. An alternator according to claim 2 further including ventilation slots defined between the casing parts and the stator assemblies.

6. An alternator according to claim 1 wherein said windings of the stator assemblies and the respective field windings have differing operating characteristics whereby at a low shaft speed a higher output is obtained from the winding of one stator assembly and at a high shaft speed a higher output is obtained from the winding of the other stator assembly.

* * * * *